(12) United States Patent
Ohmi et al.

(10) Patent No.: US 8,523,416 B2
(45) Date of Patent: Sep. 3, 2013

(54) VEHICULAR LAMP

(75) Inventors: Takeshi Ohmi, Shizuoka (JP); Takashi Matsunaga, Shizuoka (JP); Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 194 days.

(21) Appl. No.: 13/181,121

(22) Filed: Jul. 12, 2011

(65) Prior Publication Data

US 2012/0007506 A1  Jan. 12, 2012

(30) Foreign Application Priority Data

Jul. 12, 2010 (JP) ................................. 2010-157644

(51) Int. Cl.
*B60Q 1/00* (2006.01)
(52) U.S. Cl.
USPC ........... 362/538; 362/545; 362/294; 362/549; 362/487; 362/612; 315/82
(58) Field of Classification Search
USPC ............ 362/294, 296.01, 300, 487, 543–545, 362/549, 523, 538, 609–612, 617, 619, 623; 315/77, 82
See application file for complete search history.

(56) References Cited

U.S. PATENT DOCUMENTS

| | | | | |
|---|---|---|---|---|
| 6,676,283 B2 * | 1/2004 | Ozawa et al. | ................. | 362/547 |
| 7,195,381 B2 * | 3/2007 | Lynam et al. | ................. | 362/494 |
| 7,316,495 B2 * | 1/2008 | Watanabe et al. | ............. | 362/545 |
| 7,329,033 B2 * | 2/2008 | Glovatsky et al. | ............ | 362/547 |
| 7,481,561 B2 * | 1/2009 | Okuda | .......................... | 362/539 |
| 7,731,403 B2 * | 6/2010 | Lynam et al. | ................. | 362/547 |
| 7,985,013 B2 * | 7/2011 | Yasuda | .......................... | 362/547 |
| 2008/0144320 A1 | 6/2008 | Tokunaga | | |
| 2010/0253223 A1 * | 10/2010 | Inoue et al. | ..................... | 315/82 |

FOREIGN PATENT DOCUMENTS

JP     2008-153080 A   7/2008
JP     2008305718 A    12/2008

OTHER PUBLICATIONS

English abstract of Japanese Publication No. 2008-153080 published on Jul. 3, 2008, espacenet worldwide database, 1 page.
Office Action Issued in Chinese Application No. 201110192344.3, Dated: Mar. 5, 2013 (10 pages With English Translation).
English Patent Abstract of JP 2008305708 from esp@cenet, Publication Date: Dec. 18, 2008 (1 Page).

* cited by examiner

*Primary Examiner* — Haiss Philogene
(74) *Attorney, Agent, or Firm* — Osha Liang LLP (57) ABSTRACT

A vehicular lamp has a light source unit having an LED and an optical element that performs light distribution control for directing light from the LED in a predetermined direction, a heat sink to which the light source unit is attached, and a lamp chamber in which the light source unit is disposed. The LED is an LED module formed by installing an LED chip on a power supply circuit board. The LED module is installed on a circuit board installation portion of the heat sink, and an attachment, which has a frame shape a size larger than the LED module and has a circuit board retaining portion at a center open portion of the attachment, is attached and fixed to the heat sink by a fixing member, whereby the LED module is held between the attachment and the circuit board installation portion.

8 Claims, 4 Drawing Sheets

LATERAL DIRECTION
(VEHICLE-WIDTH DIRECTION)

LONGITUDINAL DIRECTION

VEHICULAR LAMP

BACKGROUND OF INVENTION

1. Field of the Invention

The present invention relates to a vehicular lamp in which a light source unit, which includes at least an LED used as a light source and a reflector that reflects the light from the light source in a predetermined direction, is attached to a heat sink and accommodated in a lamp chamber, and more particularly to a vehicular lamp in which a power supply circuit board with an LED chip is attached via an attachment to a heat sink at a predetermined position.

2. Related Art

Recently, development of a vehicular headlamp that uses an LED as a light source has been promoted. In a headlamp of this type, a light source unit, which includes an LED used as a light source and an optical element (e.g., a reflector or a projection lens) that directs the light emitted from the LED in a predetermined direction, is attached integrally to a heat sink used as a member for supporting the light source unit, and accommodated in a lamp chamber.

As described in, for example, Patent Document 1, the LED is fixed to a heat sink at a predetermined position, by placing a frame-shaped flat plate attachment, which has an open portion in its center portion, over a power supply circuit board with an LED chip (hereinafter referred to as "LED module") from above so that the LED chip is surrounded by the attachment, and then screwing the attachment onto the heat sink (from the front surface side of the attachment).

When the LED is used as a light source, it is desired that the light emitted from the LED be efficiently utilized because the LED emits a smaller amount of light than an incandescent bulb and a discharge bulb.

[Patent Document 1] Japanese Patent Application Laid-Open (Kokai) No. 2008-153080 (Paragraphs 0006, 0010, FIG. 2)

SUMMARY OF INVENTION

According to Patent Document 1, however, heads of attachment attaching screws used as members for fixing the attachment to the heat sink protrude from the front surface of the attachment. Therefore, the light heading from the LED chip, which is exposed so as to be substantially flush with the front surface of the attachment, toward a reflector is partially blocked out (cut off) by the heads of the screws. Thus, the luminous flux utilization factor of the vehicular lamp is reduced.

One or more embodiments of the present invention provide a vehicular lamp that efficiently utilizes the light emitted from an LED used as a light source.

A vehicular lamp according to one or more embodiments of the present invention has a light source unit, which includes at least an LED used as a light source and an optical element that performs light distribution control for directing light from the light source in a predetermined direction, is attached to a heat sink and accommodated in a lamp chamber, wherein the LED is an LED module formed by installing an LED chip on a power supply circuit board, and the LED module is installed on a circuit board installation portion of the heat sink, and an attachment, which has a frame shape a size larger than the LED module and has a circuit board retaining portion at a center open portion of the attachment, is attached and fixed to the heat sink by a fixing member, whereby the LED module is held between the attachment and the circuit board installation portion, is formed such that a step which offsets a seating surface that contacts the fixing member and that is formed in the attachment toward an attached surface of the attachment, which is attached to the heat sink, is formed so that the fixing member is located outside an optical path between a center of light emission of the LED and the optical element.

(Operation) Because the seating surface that contacts the fixing member and that is formed in the attachment is offset (countersunk) toward the attached surface of the attachment, which is attached to the heat sink, by the step, a crest part of the attachment fixing member is located closer to the attached surface which is attached to the heat sink accordingly. Thus, the crest part of the attachment fixing member no longer exists on the optical path of the light heading from the center of light emission of the LED (LED chip) exposed at the open portion of the attachment toward the optical element.

That is, because the light heading from the LED (LED chip) used as the light source toward the optical element is not blocked out (cut off) by (the crest part of) the attachment fixing member, the light emitted from the LED chip entirely heads toward the optical element used as a light distribution control member.

In order to prevent blockage of the light heading from the LED chip toward the optical element due to the attachment fixing member, the thickness of the power supply circuit board of the LED module may be increased such that the position at which the LED chip is arranged is raised. With this arrangement, the center of light emission of the LED chip is located at a position higher than the crest part of the fixing member. However, an increase in the thickness raises the cost of the parts of the LED module accordingly. Moreover, an increase in the thickness increases the length of a path for dissipating the heat generated by a light emitting portion. This may reduce the heat dissipation performance of the LED module. With this configuration, however, just changing the shape of the attachment (forming the step) makes it possible to use a LED module formed by a standard product in an unchanged form.

In the vehicular lamp according to one or more embodiments of the present invention, a positioning portion for the LED module is formed at the circuit board installation portion of the heat sink.

(Operation) Because the LED module is directly positioned with respect to the heat sink, the accuracy of a fixed position of the light source (LED chip) is high.

In the vehicular lamp according to one or more embodiments of the present invention, the optical element includes a reflector that reflects the light from the light source in the predetermined direction, and the reflector is configured to be fixed to the heat sink directly or via another member.

(Operation) The LED module is fixed to the heat sink, and the reflector is fixed to the heat sink directly or via the other member. Thus, the light source (LED chip) and the reflector are fixed to the same member (heat sink), and the accuracy of the position of the reflector relative to the light source (LED chip) is favorable.

In the vehicular lamp according to one or more embodiments of the present invention, the attachment includes a first current carrying terminal that electrically contacts the power supply circuit board, and a second current carrying terminal that supplies electric power from a power supply to the LED via the first current carrying terminal, and an accommodating portion that accommodates the second current carrying terminal is formed integrally with the attachment.

(Operation) It is no longer necessary to provide power supply members (member corresponding to the first current carrying terminal and the second current carrying terminal) for supplying electric power to the LED separately from the attachment.

Thus, according to one or more embodiments of the present invention, reduction in the luminous flux utilization factor in the vehicular lamp is suppressed.

According to one or more embodiments of the present invention, due to high accuracy of the fixed position of the light source, the light emitted from the light source (LED chip) is accurately incident on the optical element accordingly. Thus, the light distribution performance of the vehicular lamp is improved.

According to one or more embodiments of the present invention, due to high accuracy of the position of the reflector relative to the light source (LED chip), the light emitted from the light source (LED chip) is accurately reflected via the reflector accordingly. Thus, a highly accurate light distribute pattern is formed ahead of the vehicle, and the light distribution performance of the vehicular lamp is improved.

According to one or more embodiments of the present invention, the number of parts is reduced, whereby the structure around the LED (light source) is simplified accordingly.

Other aspects and advantages of the invention will be apparent from the following description, the drawings and the claims.

DETAILED DESCRIPTION

Hereafter, embodiments of the invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
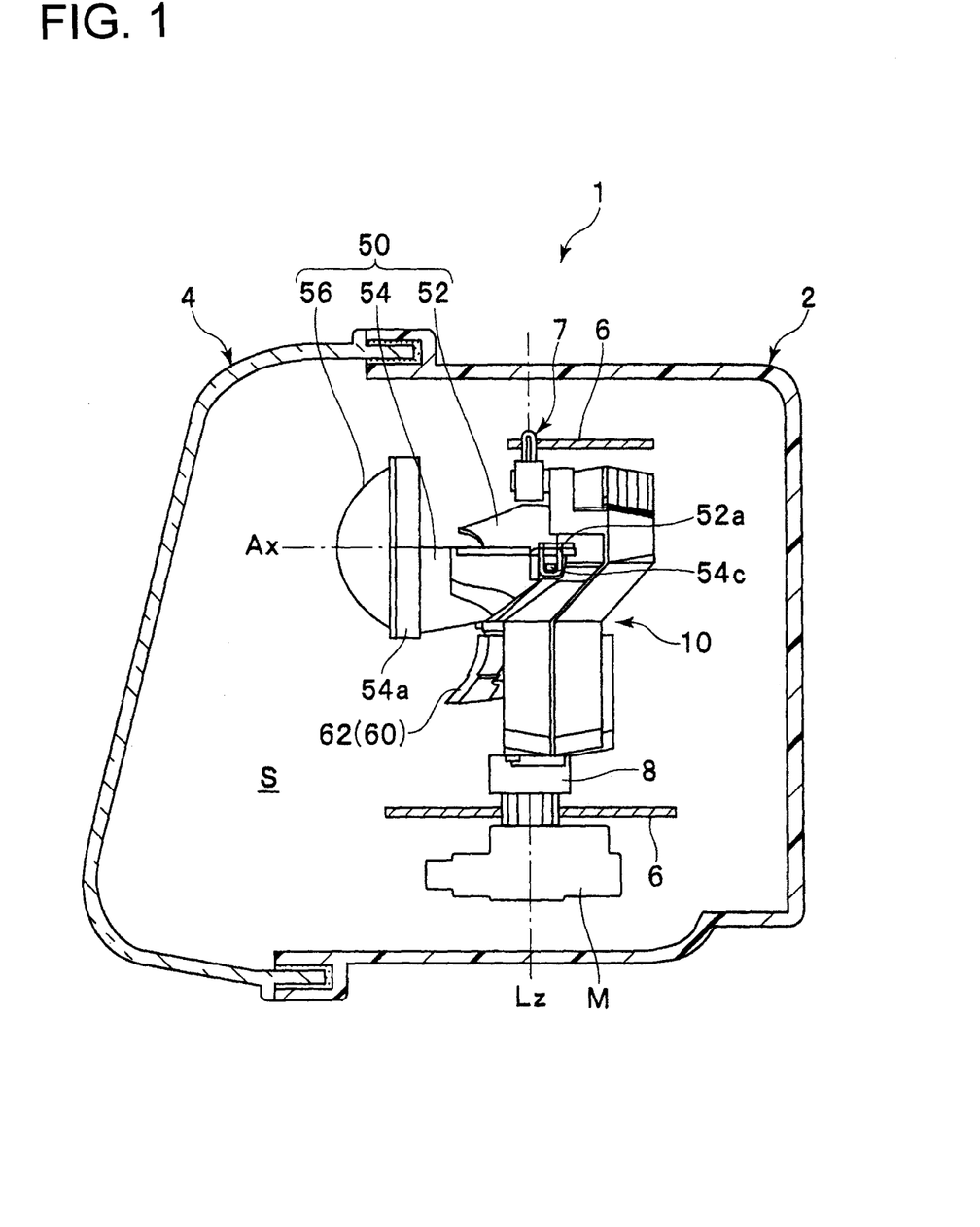
FIG. 1 is a longitudinal cross-sectional view of an automobile headlamp according to one or more embodiments of the present invention.
Figure 2:
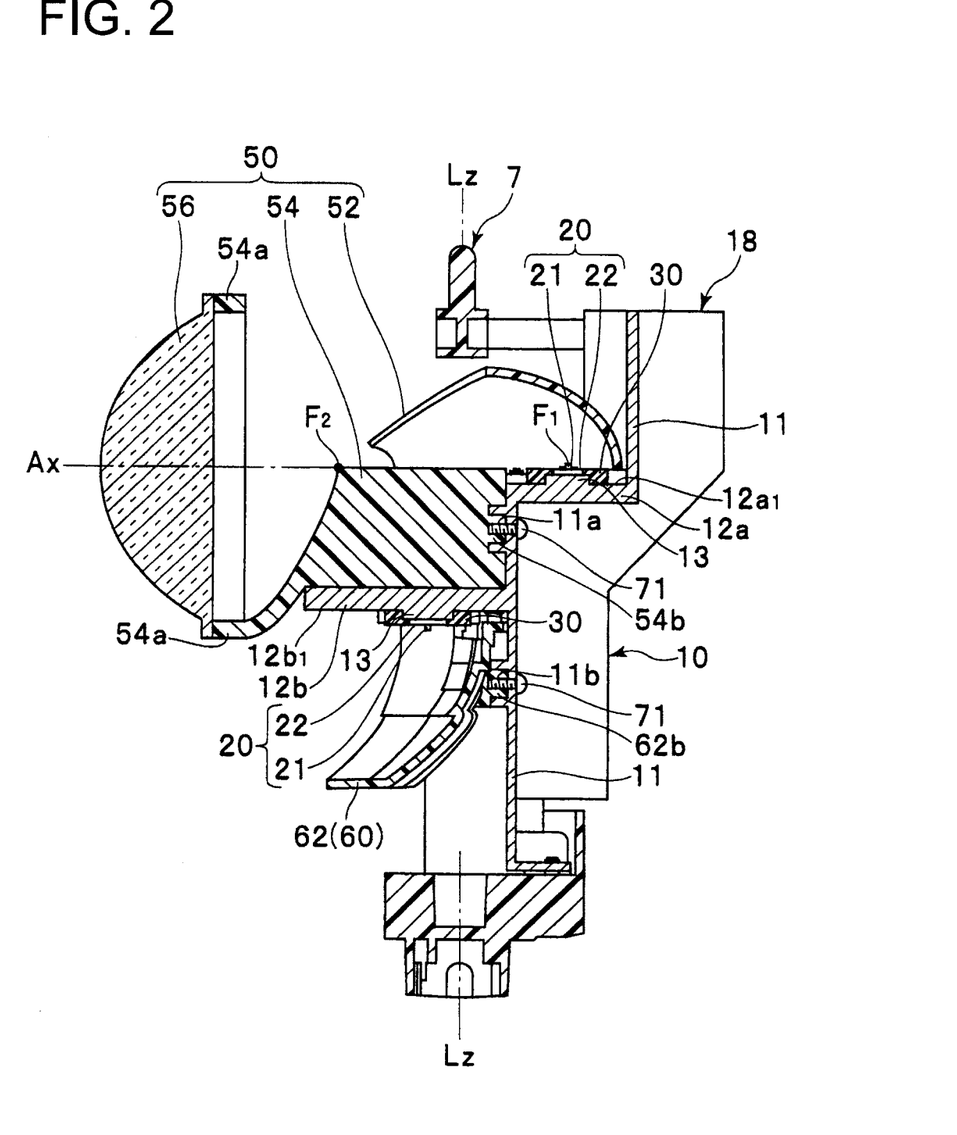
FIG. 2 is a longitudinal cross-sectional view showing a state in which light source units have been attached to a heat sink.
Figure 3:
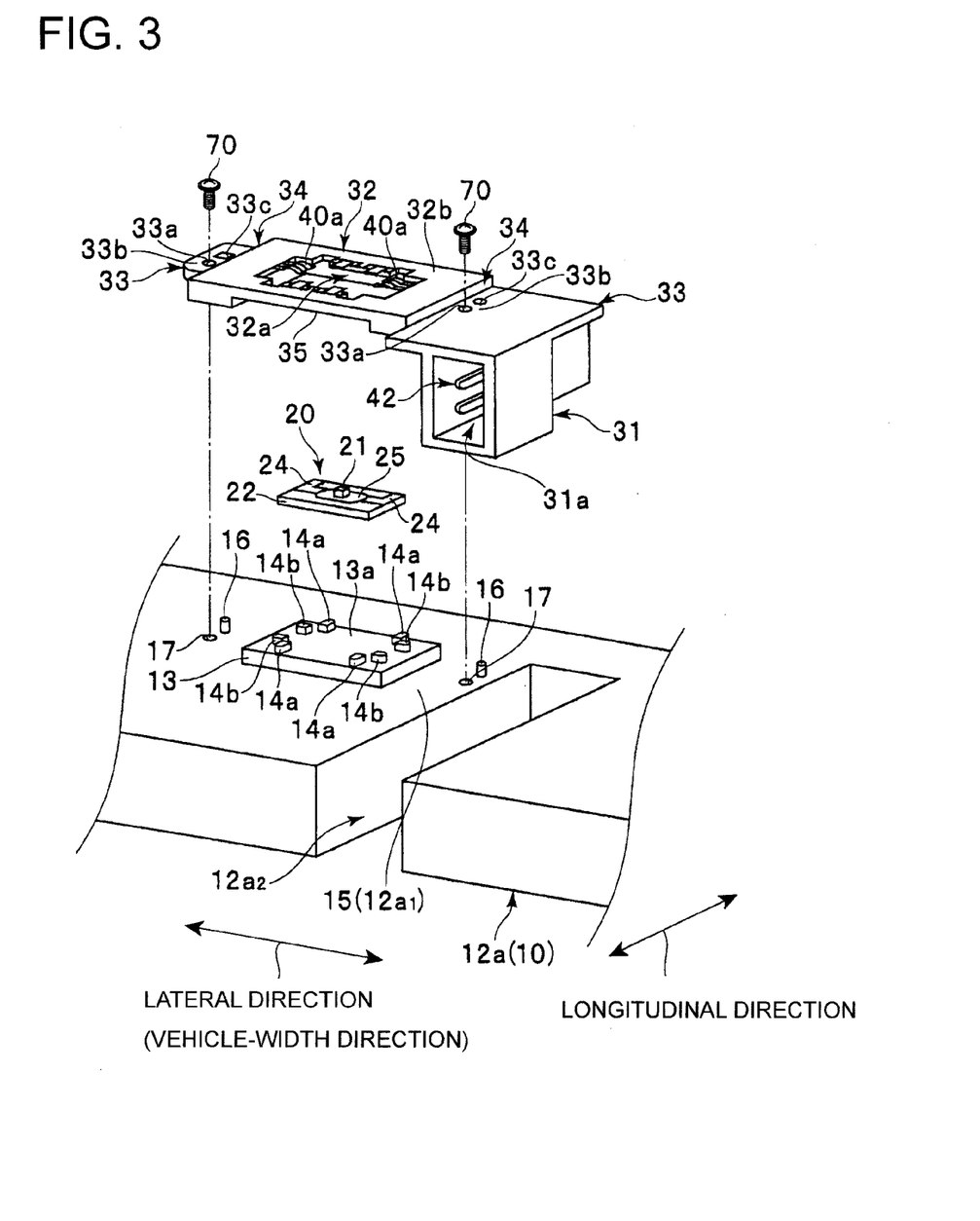
FIG. 3 is an exploded perspective view showing a fixation structure for an LED module according to one or more embodiments of the present invention.
Figure 4:
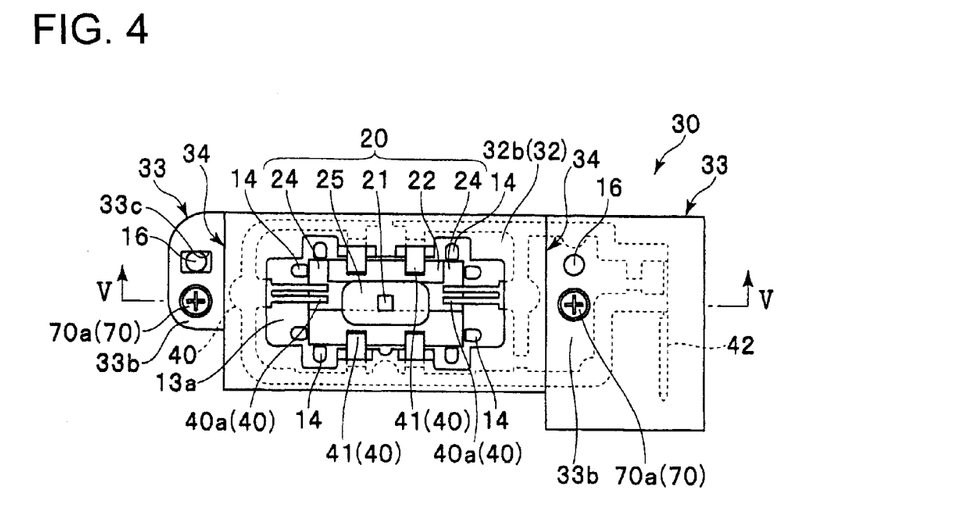
FIG. 4 is a plan view showing the fixation structure for the LED module according to one or more embodiments of the present invention.
Figure 5:
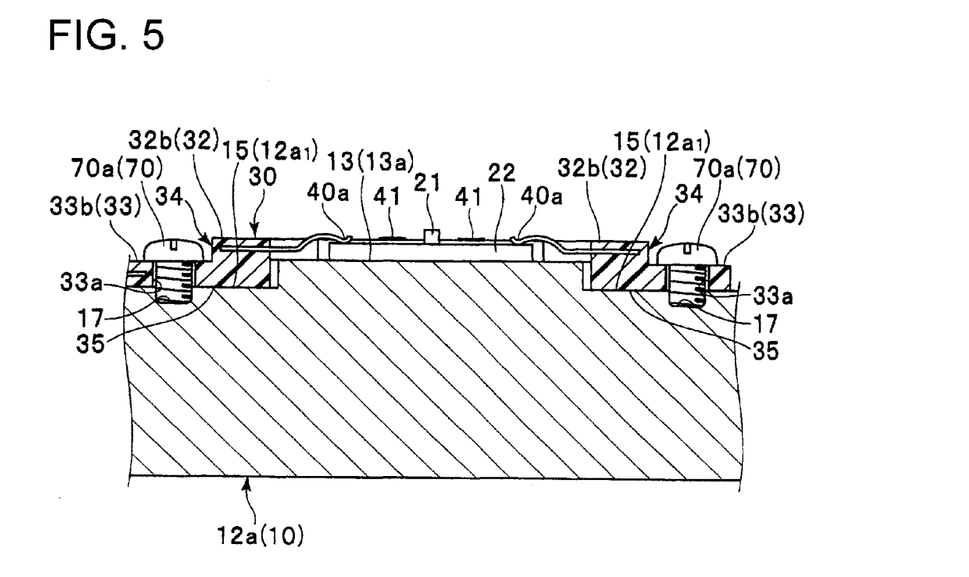
FIG. 5 is a cross-sectional view (cross-sectional view taken along the line V-V in FIG. 4) showing the fixation structure for the LED module according to one or more embodiments of the present invention.

FIGS. 1 to 5 show a vehicular headlamp according to one or more embodiments of the present invention. FIG. 1 is a longitudinal cross-sectional view of an automobile headlamp according to a one or more embodiments of the present invention. FIG. 2 is a longitudinal cross-sectional view showing a state in which light source units have been attached to a heat sink. FIG. 3 is an exploded perspective view showing a fixation structure for an LED module according to one or more embodiments of the present invention. FIG. 4 is a plan view showing the fixation structure for the LED module according to the present embodiment. FIG. 5 is a cross-sectional view (cross-sectional view taken along the line V-V in FIG. 4) showing the fixation structure for the LED module according to one or more embodiments of the present invention.

In these figures, in a vehicular headlamp 1, a projection-type light source unit 50 and a reflection-type (parabolic) light source unit 60, each using an LED described below as a light source, are accommodated in a lamp chamber S that is formed by a lamp body 2 and a front cover (outer lens) 4 attached to a front end open portion of the lamp body 2, as shown in FIGS. 1 and 2. The projection-type light source unit 50 and the reflection-type light source unit 60 are configured to be arranged one above the other and attached integrally to the front side of a heat sink 10 described below. The reflection-type light source unit 60 is placed vertically below the projection-type light source unit 50 so as to be substantially in contact with the projection-type light source unit 50. Radiation patterns of the light source units 50, 60 are combined into a predetermined elaborate low-beam distribution pattern. The heat sink 10 to which the light source units 50, 60 are integrally attached is supported so as to be rotatable in a horizontal direction with respect to an aluminum die-cast lamp housing 6 having a rectangular frame shape. The heat sink 10 may be swiveled (pivoted) about a swivel axis Lz by a swivel motor M fitted to a lower wall of the lamp housing 6 via a joint assembly 8.

Each configuration will be described in detail below.

Each LED (semiconductor light emitting element) used as the light source is specifically an LED module 20 that emits white light and that is formed by bonding an LED chip 21, with an adhesive 25, onto a thermal conductive insulating power supply circuit board (e.g., ceramics) 22 having a high heat dissipation property. Power supply portions 24 for a cathode and an anode are formed on an upper surface of the power supply circuit board 22 at both sides in a longitudinal direction of the power supply circuit board 22.

The heat sink 10 to which the light source units 50, 60 are attached (fixed) is an aluminum die-casting consisting primarily of aluminum and having a rectangular shape as viewed from the front. The heat sink 10 has a vertical panel portion 11 to which the light source units 50, 60 are screwed, an upper step portion 12a to which the LED module 20 used as the light source of the projection-type light source unit 50 is fixed, and a lower step portion 12b to which the LED module 20 used as the light source of the reflection-type light source unit 60 is fixed. Heat dissipation fins 18 for facilitating heat dissipation from the light source units 50, 60 are formed integrally with the vertical panel portion 11 on the entire back side and at a predetermined position (at such a position that fixation of the projection-type light source unit 50 to the vertical panel portion 11 is not hindered) on the front side. A shaft 7 that extends along the swivel axis Lz and that is used to swivel the light source units 50, 60 is provided at a position above the heat sink 10.

A screw insertion hole 11a used to screw the projection-type light source unit 50 to the heat sink 10 is formed at substantially the center portion of the vertical panel portion 11 between the upper step portion 12a and the lower step portion 12b. Further, a screw insertion hole 11b used to screw the reflection-type light source unit 60 to the heat sink 10 is formed at substantially the center portion of the vertical panel portion 11 below the lower step portion 12b.

A light source seat 13, which is used as a circuit board installation portion for the LED module 20 for the projection-type light source unit 50, is formed integrally with an upper surface 12a1 of the upper step portion 12a of the heat sink 10, at the center portion in a vehicle-width direction (lateral direction). The upper surface 12a1 around the light source seat 13 is used as a surface (attachment attached surface 15)

that contacts an attached surface 35 of an attachment 30, described below. The attachment 30 is attached at the attached surface 35 to the heat sink 10. Attachment positioning protrusions 16 and attachment attaching screw holes 17 are formed at predetermined positions in the attachment attached surface 15. The attachment positioning protrusions 16 engage with positioning holes 33*c* formed in the attachment 30, and the attachment attaching screw holes 17 receive attachment attaching screws 70 used as attachment fixing members. A recess 12*a*2 that houses a socket portion 31 of the attachment 30 is formed at a predetermined position of the upper step portion 12*a*.

As in the upper step portion 12*a*, a light source seat 13 on which the LED module 20 for the reflection-type light source unit 60 is installed, attachment positioning protrusions 16, and attachment attaching screw holes 17 are formed in a lower surface 12*b*1 of the lower step portion 12*b* of the heat sink 10, at the center portion in the vehicle-width direction. Further, a recess 12*b*2 that houses a socket portion 31 of another attachment 30 is formed at a predetermined position of the lower step portion 12*b* so as to be inclined 10° with respect to the vehicle-width direction (lateral direction).

As shown in FIGS. 3 to 5, the light source seat 13 used as the circuit board installation portion is a rectangular seat that is larger than the power supply circuit board 22 of the LED module 20, and the LED module 20 is installed on an upper surface (circuit board installation surface) 13*a* of the light source seat 13. A total of eight LED fixing protrusions 14 used to position the power supply circuit board 22 in the longitudinal and lateral directions are provided at four locations near the corners of the circuit board installation surface 13*a* in order to accurately install the power supply circuit board 22 of the LED module 20 on the circuit board installation surface 13*a*. Specifically, the power supply circuit board 22 is positioned and fixed in the longitudinal direction by LED fixing protrusions 14*a* and is positioned and fixed in the lateral direction by LED fixing protrusions 14*b* (see FIG. 3).

As shown in FIGS. 3 to 5, the attachment 30 is a generally frame-shaped flat plate member that has a predetermined thickness and that is a size larger than the outer shape of the LED module 20. The attachment 30 is a resin product that has a frame portion 32, screw fastened portions 33 and the socket portion 31 that are integrally formed with each other. An open portion 32*a* having a generally rectangular shape that matches the overall outer shape of the power supply circuit board 22 of the LED module 20 and the LED fixing protrusions 14 is formed in substantially the center portion of the frame portion 32. The screw fastened portions 33 are formed at both ends of the frame portion 32 in the longitudinal direction. The socket portion 31 has an open portion 31*a* which is formed below one of the screw fastened portions 33, and in which an electric power supply-side power supply terminal 42 (second current carrying terminal in one or more embodiments of the present invention) is accommodated.

A metal wiring body 40 is provided, through insert molding, inside the attachment 30 (the frame portion 32 and the screw fastened portion 33 on the side on which the socket portion 31 is provided). The metal wiring 40 is electrically connected to the electric power supply-side power supply terminal 42 provided in (the open portion 31*a* of) the socket portion 31. The wiring body 40 is insulated as appropriate so that a current flows appropriately.

A screw attaching hole 33*a* used to attach (fix) the attachment 30 to the heat sink 10 and the positioning hole 33*c* used to position the attachment 30 with respect to the heat sink 10 are formed in each screw fastened portion 33 of the attachment 30. The attachment attaching screws 70 are inserted into the screw attaching holes 33*a* from the front surface of the attachment 30 (surface on the opposite side of the attachment 30 from the attached surface 35 that is attached to the heat sink 10), and are screwed into the attachment attaching screw holes 17 formed in the heat sink 10. Thus, heads 70*a* of the attachment attaching screws 70 are attached to front surfaces (seating surface that contacts a fixing member in one or more embodiments of the present invention; hereinafter referred to as "screw attached seating surfaces") 33*b* of the screw fastened portions 33.

A step 34 is formed between the frame portion 32 and each screw fastened portion 33 so that a countersink is formed.

That is, in order that the heads 70*a* of the attachment attaching screws 70 do not block out the light heading from the LED chip 21 toward a reflector 52 or a projection lens 56 when the LED module 20 is fixed to the heat sink 10 via the attachment 30, the screw attached seating surfaces 33*b* of the attachment 30 are offset toward the attached surface 35, which is attached to the heat sink 10, by an amount larger than the thickness of each screw head 70*a* so as to be one level lower. Thus, the screw attached seating surfaces 33*b* of the attachment 30 are formed at a position lower than the front surface 32*b* of the frame portion 32 (see FIG. 5).

LED current carrying terminals (first current carrying terminal in claim 4) 40*a*, which are parts of the wiring body 40 each having its tip end curved downward and each extended in a bifurcated form, are formed so as to face each other and so as to extend from both wall surfaces on the shorter sides of the open portion 32*a* at which the LED module 20 is exposed when the attachment 30 is screwed onto the heat sink 10. Further, circuit board retaining portions 41, which are parts of the wiring body 40 each extended in the shape of a leaf spring, are formed at four locations so as to face each other and so as to extend from both wall surfaces on the longer sides of the open portion 32*a*.

That is, the LED current carrying terminals 40*a* (first current carrying terminal) that electrically contact the power supply portions 24 of the LED module 20 are integrally formed at the open portion 32*a* of the attachment 30, and the electric power supply-side power supply terminal 42 (second current carrying terminal) is integrally formed inside the socket portion 31 of the attachment 30. Thus, it is no longer necessary to provide power supply members (members corresponding to the LED current carrying terminals 40*a* and the electric power supply-side power supply terminal 42) used to supply electric power to the LED module 20 separately from the attachment 30. This reduces the number of parts accordingly, and thus simplifies the structure near the LED module 20 (light source) accordingly.

In order to fix the LED module 20 used as the light source of the projection-type light source unit 50 to the upper step portion 12*a* of the heat sink 10, the power supply circuit board 22 of the LED module 20 is first engaged with a region defined by the LED fixing protrusions 14 on the circuit board installation surface 13*a* formed on the heat sink 10. Thus, the LED module 20 is positioned accurately and directly with respect to the heat sink 10 at its lower surface and in the longitudinal and lateral directions. Accordingly, the LED chip 21 used as the light source is placed on an optical axis Ax of the reflector 52 and the projection lens 56 of the projection-type light source unit 50 described below.

Next, the attachment 30 is placed over the positioned LED module 20 from above such that the positioning holes 33*c* of the attachment 30 engage with the attachment positioning protrusions 16 of the heat sink 10. Thus, the power supply circuit board 22 of the LED module 20 and the LED fixing protrusions 14 engage with the open portion 32*a* of the attachment 30, and (the frame portion 32 of) the attachment 30 surrounds the LED module 20. As a result, the LED chip 21 is placed at the center of the open portion 32a. Further, the LED current carrying terminals 40a of the attachment 30 contact the power supply portions 24 of the LED module 20, and the circuit board retaining portions 41 of the attachment 30 contact the upper surface of the power supply circuit board 22 of the LED module 20. The screw attaching holes 33a of the attachment 30 are aligned with the attachment attaching screw holes 17 of the heat sink 10. Thus, the socket portion 31 of the attachment 30 is housed in the socket housing recess 12a2 of the heat sink 10.

In this state, however, (the attached surface 35 of) the attachment 30 (which is to be attached to the heat sink) is not in complete surface contact with (the attachment attached surface 15 of) the heat sink 10 due to an energizing force of the circuit board retaining members 41.

Then, in this state, the attachment attaching screws 70 are inserted from the front surface side of the attachment 30, and are tightened in the attachment attaching screw holes 17 of the heat sink 10. Thus, the attachment 30 is pressed toward the side of the attached surface 35 to be attached to the heat sink, by a fastening force of the attachment attaching screws 70. As a result, the attached surface 35 of the attachment 30, which is to be attached to the heat sink, is brought into surface contact with and thereby fixed to the attachment attached surface 15 of the heat sink 10.

Thus, the LED module 20 is held between (the LED current carrying terminals 40a and the circuit board retaining portions 41 of) the attachment 30 and (the circuit board installation surface 13a of) the heat sink 10. In this state, the LED module 20 is fixed in the vertical direction in addition to the longitudinal and lateral directions.

When the attachment 30 is screwed (to the heat sink 10), the power supply portions 24 of the LED module 20 are pressed by an elastic force caused by deformation of the LED current carrying terminals 40a at the open portion 32a of the attachment 30. Thus, the LED power supply terminals 40a are reliably in contact with the power supply portions 24. In this state, a predetermined power supply connector is connected to the electric power supply-side power supply terminal 42 in the socket portion 31 of the attachment 30. As a result, electric power is reliably supplied to (the power supply portions 24 of) the LED module 20 via the electric power supply-side power supply terminal 42 and the LED current carrying terminals 40a.

Moreover, due to the elastic force caused by deformation of the LED current carrying terminals 40a and the circuit board retaining portions 41, the lower surface (back surface) of the power supply circuit board 22 of the LED module 20 is pressed against the circuit board installation surface 13a of the heat sink 10, and is thus reliably brought into close contact with the circuit board installation surface 13a. This improves the heat dissipation performance of the heat sink 10, thereby preventing reduction in light emission efficiency of the LED chip 21.

In this fixed state, the light emission center of the LED chip 21 installed on the power supply circuit board 22 is placed at a position higher than the front surface 32b of the frame portion 32 of the attachment 30 and (the crest parts of) the LED current carrying terminals 40a and the circuit board retaining portions 41. Further, the heads 70a of the attachment attaching screws 70 are offset toward the attached surface 35, which is attached to the heat sink, due to the steps 34 between the screw fastened portions 33 and the frame portion 32 of the attachment 30, and thus do not extend upward beyond the front surface 32b of the frame portion 32.

Meanwhile, at the reflection-type light source unit 60, the attachment 30 is placed, from beneath, over the LED module 20 that is installed on the light source seat 13 provided on the lower surface 12b1 of the lower step portion 12b of the heat sink 10 so as to face downward. Then, the LED module 20 is fixed in a manner similar to that in the case of the projection-type light source unit 50. The heads 70a of the attachment attaching screws 70 are offset toward the attached surface 35, which is attached to the heat sink, due to the steps 34, and thus do not extend downward beyond the front surface 32b of the frame portion 32.

The projection-type light source unit 50 is formed by the reflector 52 made of resin, the projection lens 56 made of resin, and a shade 54 made of resin.

The reflector 52 has a generally ellipsoidal reflective surface, and is placed above the LED module 20 when the projection-type light source unit 50 is screwed to the heat sink 10. The LED chip 21 is placed at a first focal point F1 of an ellipse that forms a vertical cross section of the reflective surface, so that the light from the LED chip 21 is substantially converged to a second focal point F2 of the ellipse. Moreover, a light source image formed on a focal plane at the focal point F2 is radiated forward as an inverted image by the projection lens 56 placed in front of the light source (the LED chip 21). Further, paired fixing shade legs 52a, each having an open portion that engages with a hook portion 54c of the shade 54 described below, are provided on both right and left sides of the reflector 52.

The shade 54 is a member that blocks out a part of the light reflected from the reflective surface of the reflector 52 to form a cut-off line. The shade 54 has a lens holder 54a and a boss 54b that has an internally threaded portion in its inner periphery. The lens holder 54a is formed at the front end of the shade 54, and used to attach the projection lens 56. The boss 54b is formed integrally on the back surface of the shade 54 so as to extend from the back surface. The fixing hook portions 54c that may be protrusion-recess lance-engaged with the fixing legs 52a of the reflector 52 are provided on both outer side surfaces behind the upper surface of the shade 54.

The projection lens 56 is fitted to the lens holder 54a of the shade 54, and thus attached and fixed to the shade 54. Then, the reflector 52 is attached and fixed to the shade 54 by projection-recess lance-engaging (the open portions of) the fixing legs 52a with the hook portions 54c. As a result, the projection-type light source unit 50 is formed in which the projection lens 56 and the reflector 52 are accurately fixed to and held by the shade 54.

In order to fix the projection-type light source unit 50, in which the projection lens 56 and the reflector 52 are integrated with the shade 54, to the heat sink 10, the boss 54b on the back surface of the shade 54 is aligned with the screw insertion hole 11a formed in the vertical panel portion 11 of the heat sink 10, and a light source unit fixing screw 71 is inserted into the screw insertion hole 11a from the back surface side of the heat sink 10, and is tightened in the internally threaded portion provided in the inner periphery of the boss 54b of the shade 54. Thus, the projection-type light source unit 50 is reliably fixed to the heat sink 10 via the shade 54.

Meanwhile, the reflection-type light source unit 60 is a parabolic reflector 62 made of resin, and placed below the LED module 20 for the reflection-type light source unit 60. The reflector 62 has a reflective surface formed by using, as a reference surface, a paraboloidal surface having a focal point in the proximity of the LED module 20. The reflector 62 reflects the light from the LED chip 21 forward to radiate the light as substantially parallel light fluxes (radiate the light in a diffused manner in a horizontal direction). A boss 62b having an internally threaded portion formed in its inner periphery is also formed at substantially the center portion on the back surface side of the reflector 62 so as to extend from the back surface. The boss 62b is aligned with the screw insertion hole 11b, and another light source unit fixing screw 71 is inserted into the screw insertion hole 11b from the back surface side of the heat sink 10, and is tightened in the internally threaded portion of the boss 62b. Thus, the reflection-type light source unit 60 is reliably fixed directly to the heat sink 10.

With the above configuration, the LED modules 20, and the projection-type light source unit 50 and the reflection-type light source unit 60 that are used as light distribution members are all accurately fixed to the same member (the heat sink 10).

That is, in the projection-type light source unit 50, the LED chip 21 (LED module 20) used as the light source is directly positioned on and fixed to the light source seat 13 of the heat sink 10. This results in high accuracy of the fixed position of the LED chip 21. Moreover, the projection-type light source unit 50 is also fixed with both the reflector 52 and the projection lens 56 accurately positioned with respect to the light source seat 13 (via the shade 54). This results in high accuracy of the positions of the reflector 52 and the projection lens 56 relative to the LED chip 21 used as the light source.

Thus, because respective optical axes are aligned, the light emitted from the LED chip 21 is accurately incident on the reflector 52 and the projection lens 56. Due to the high accuracy of the positions of the reflector 52 and the projection lens 56 relative to the LED chip 21, the light incident on the reflector 52 is accurately reflected by the reflector 52, and is accurately radiated ahead of the vehicle by the projection lens 56.

Meanwhile, in the reflection-type light source unit 60, the accuracy of the fixed position of the LED chip 21 is high, and, moreover, the accuracy of the position of the reflector 62 relative to the LED chip 21 is higher because the reflector 62 is directly screwed onto the heat sink 10. Thus, the light from the LED chip 21 is accurately incident on the reflector 62, and is reflected ahead of the vehicle by the reflector 62 with high accuracy.

Thus, due to the high light distribution performance of the vehicle headlamp 1, an elaborate light distribution pattern is formed ahead of the vehicle accordingly.

Moreover, at this time, the center of light emission of the LED chip 21 used as the light source is located above the front surface 32b of the frame portion 32 of the attachment 30 and (the crest parts of) the LED current carrying terminals 40a and the circuit board retaining portions 41 in the projection-type light source unit 50. In the reflection-type light source unit 60, the center of light emission of the LED chip 21 used as the light source is located below the front surface 32b of the frame portion 32 of the attachment 30 and (the crest parts of) the LED current carrying terminals 40a and the circuit board retaining portions 41. The heads 70a of the attachment attaching screws 70 on the screw attached seating surfaces 33b do not extend upward beyond the front surface 32b of the frame portion 32 in the projection-type light source unit 50. In the reflection-type light source unit 60, the heads 70a of the attachment attaching screws 70 on the screw attached seating surfaces 33b do not extend downward beyond the front surface 32b of the frame portion 32. Thus, the heads 70a of the attachment attaching screws 70 no longer exist on optical paths of the lights heading from the centers of light emission of the LEDs (the LED chips 21) toward optical elements (the reflectors 52, 62 and the projection lens 56).

That is, the light heading from each LED chip 21 used as the light source toward the reflector 52 (62) or the light heading from the LED chip 21 directly toward the projection lens 56 is no longer blocked out (cut off) by the heads 70a of the attachment attaching screws 70.

Thus, the light emitted from the LED chip 21 is entirely directed toward the reflector 52 (62) or the projection lens 56 used as a light distribution control member. Therefore, the light emitted from the LED chip 21 is effectively utilized without waste, and the luminous flux utilization factor of the vehicular headlamp 1 is not reduced.

In order to prevent blockage of the light heading from the LED chip 21 toward, for example, the reflector 52 due to the heads 70a of the attachment attaching screws 70, the thickness of the power supply circuit board 22 of the LED module 20 may be increased such that the position at which the LED module 20 is arranged is raised. With this arrangement, the LED chip 21 (light source) is located at a position higher than the screw heads 70a. However, an increase in the thickness raises the cost of the parts of the LED module 20 accordingly. Moreover, an increase in the thickness increases the length of a path for dissipating the heat generated by the light emitting portion. This may reduce the heat dissipation performance of the LED module 20.

With this configuration, however, just changing the shape of the attachment 30 (forming the steps 34) makes it possible to use the LED module 20 formed by a standard product in an unchanged form. Thus, the cost of the parts of the LED module 20 is not increased, and the heat dissipation performance does not become lower than that of the standard product.

In the description of one or more embodiments of the present invention, the fastening screws are used as the attachment fixing members. However, instead of the fastening screws, for example, rivets, leaf springs, may be used as the attachment fixing members.

The projection-type light source unit 50 may be configured so as not to include the projection lens 56. In this case, the projection lens 56 is placed at a predetermined position in front of the projection-type light source unit 50 in the direction of the optical axis Ax, during assembly of the vehicular headlamp 1.

Note that each of the reflector 52 (62) and the projection lens 56 in the above description is an example of the optical element according to one or more embodiments of the present invention.

Note that the vehicular lamp is not limited to a vehicular headlamp, and for example, a headlamp, a fog lamp, a bending lamp may be used.

One or more embodiments of the present invention may also be applied to an infrared LED instead of the white LED. A semiconductor laser may be used as a light source instead of the LED.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS

1 VEHICULAR HEADLAMP
10 HEAT SINK
11 VERTICAL PANEL PORTION

13 LIGHT SOURCE SEAT
13a CIRCUIT BOARD INSTALLATION SURFACE
14 LED MODULE FIXING PROTRUSION
17 ATTACHMENT ATTACHING SCREW HOLE
20 LED MODULE
21 LED CHIP
30 ATTACHMENT
31 SOCKET PORTION
32 FRAME PORTION
32a OPEN PORTION
32b FRONT SURFACE OF FRAME PORTION
33 SCREW FASTENED PORTION
33a SCREW ATTACHING HOLE
33b SCREW ATTACHED SEATING SURFACE
34 STEP
35 ATTACHED SURFACE OF ATTACHMENT, ATTACHED TO HEAT SINK
40a LED CURRENT CARRYING TERMINAL
41 CIRCUIT BOARD RETAINING PORTION
42 ELECTRIC POWER SUPPLY-SIDE POWER SUPPLY TERMINAL
50 PROJECTION-TYPE LIGHT SOURCE UNIT
52 REFLECTOR
54 SHADE
56 PROJECTION LENS
60 REFLECTION-TYPE LIGHT SOURCE UNIT
62 REFLECTOR
70 ATTACHMENT ATTACHING SCREW
70a HEAD OF ATTACHMENT ATTACHING SCREW
71 LIGHT SOURCE UNIT FIXING SCREW

What is claimed is:

1. A vehicular lamp comprising:
a light source unit comprising:
   an LED, and
   an optical element that performs light distribution control for directing light from the LED in a predetermined direction,
a heat sink to which the light source unit is attached;
a lamp chamber in which the light source unit is disposed,
wherein the LED is an LED module formed by installing an LED chip on a power supply circuit board,
wherein the LED module is installed on a circuit board installation portion of the heat sink, and an attachment, which has a frame shape a size larger than the LED module and has a circuit board retaining portion at a center open portion of the attachment, is attached and fixed to the heat sink by a fixing member, whereby the LED module is held between the attachment and the circuit board installation portion,
wherein a step, which offsets a seating surface that contacts the fixing member and that is formed in the attachment toward an attached surface of the attachment, which is attached to the heat sink, is formed so that the fixing member is located outside an optical path between a center of light emission of the LED and the optical element.

2. The vehicular lamp according to claim 1,
wherein a positioning portion for the LED module is formed at the circuit board installation portion of the heat sink.

3. The vehicular lamp according to claim 1,
wherein the optical element includes a reflector that reflects the light from the light source in the predetermined direction, and the reflector is fixed to the heat sink directly or via another member.

4. The vehicular lamp according to claim 1,
wherein the attachment comprises:
   a first current carrying terminal that electrically contacts the power supply circuit board, and
   a second current carrying terminal that supplies electric power from a power supply to the LED via the first current carrying terminal, and
wherein an accommodating portion that accommodates the second current carrying terminal is formed integrally with the attachment.

5. The vehicular lamp according to claim 2, wherein the optical element includes a reflector that reflects the light from the LED in the predetermined direction, and the reflector is fixed to the heat sink directly or via another member.

6. The vehicular lamp according to claim 2,
wherein the attachment comprises:
   a first current carrying terminal that electrically contacts the power supply circuit board, and
   a second current carrying terminal that supplies electric power from a power supply to the LED via the first current carrying terminal, and
wherein an accommodating portion that accommodates the second current carrying terminal is formed integrally with the attachment.

7. The vehicular lamp according to claim 3,
wherein the attachment comprises:
   a first current carrying terminal that electrically contacts the power supply circuit board, and
   a second current carrying terminal that supplies electric power from a power supply to the LED via the first current carrying terminal, and
wherein an accommodating portion that accommodates the second current carrying terminal is formed integrally with the attachment.

8. The vehicular lamp according to claim 5,
wherein the attachment comprises:
   a first current carrying terminal that electrically contacts the power supply circuit board, and
   a second current carrying terminal that supplies electric power from a power supply to the LED via the first current carrying terminal, and
wherein an accommodating portion that accommodates the second current carrying terminal is formed integrally with the attachment.

* * * * *